US008554412B2

United States Patent

(12) United States Patent
Hosoya et al.

(10) Patent No.: US 8,554,412 B2
(45) Date of Patent: Oct. 8, 2013

(54) ELECTRIC POWER STEERING APPARATUS, CONTROL METHOD THEREOF AND PROGRAM

(75) Inventors: Narimasa Hosoya, Tochigi (JP); Shunya Senda, Tochigi (JP); Fumiaki Ishikawa, Tochigi (JP)

(73) Assignee: Showa Corporation, Saitama (JP)

( * ) Notice: Subject to any disclaimer, the term of this patent is extended or adjusted under 35 U.S.C. 154(b) by 399 days.

(21) Appl. No.: 13/055,316

(22) PCT Filed: Jun. 16, 2010

(86) PCT No.: PCT/JP2010/060210
§ 371 (c)(1), (2), (4) Date: Jan. 21, 2011

(87) PCT Pub. No.: WO2011/070812
PCT Pub. Date: Jun. 16, 2011

(65) Prior Publication Data

US 2012/0035807 A1 Feb. 9, 2012

(30) Foreign Application Priority Data

Dec. 11, 2009 (JP) ................................ 2009-281343

(51) Int. Cl.
*B62D 5/04* (2006.01)

(52) U.S. Cl.
USPC ............................................... 701/41; 701/42

(58) Field of Classification Search
USPC ....................... 701/41–43; 180/412, 443, 446
See application file for complete search history.

(56) References Cited

U.S. PATENT DOCUMENTS

| | | | | |
|---|---|---|---|---|
| 4,918,744 | A | 4/1990 | Shimizu | |
| 5,040,630 | A | 8/1991 | Morishita et al. | |
| 8,306,698 | B2 * | 11/2012 | Suzuki et al. | 701/41 |
| 8,326,489 | B2 * | 12/2012 | Oniwa et al. | 701/41 |
| 8,380,398 | B2 * | 2/2013 | Kariatsumari et al. | 701/41 |

FOREIGN PATENT DOCUMENTS

| | | |
|---|---|---|
| JP | 60-229866 | 11/1985 |
| JP | 64-9064 | 1/1989 |
| JP | 6-51474 B | 2/1994 |
| JP | 6-72349 | 3/1994 |
| JP | 6-99832 | 4/1994 |
| JP | 8-295257 | 11/1996 |
| JP | 2001-191933 | 7/2001 |
| JP | 2001-278083 | 10/2001 |

* cited by examiner

*Primary Examiner* — Richard Camby
(74) *Attorney, Agent, or Firm* — Morgan, Lewis & Bockius LLP

(57) ABSTRACT

Provided are: an electric motor that applies steering assist force to a steering wheel; a target current determination unit 25 that calculates a target current to be supplied to the electric motor on the basis of steering torque of the steering wheel; and a correction unit 27 that, when a rotation speed of the electric motor is less than a predetermined rotation speed, corrects the target current calculated by the target current determination unit 25 to be reduced on the basis of an actual current supplied to the electric motor and a time during which the actual current is supplied. Thereby a technique is provided to suppress a failure of the electric motor due to an excessive current flowing through the electric motor with higher accuracy.

5 Claims, 8 Drawing Sheets

FIG.5A

| Im | ADDITION VALUE Cp |
|---|---|
| EQUAL TO OR MORE THAN 80 A | 1200 |
| EQUAL TO OR MORE THAN 60 A | 600 |
| EQUAL TO OR MORE THAN 40 A | 100 |
| EQUAL TO OR MORE THAN 20 (I1) A | 10 |

FIG.5B

| Im | ADDITION VALUE Cp |
|---|---|
| EQUAL TO OR MORE THAN 80 A | 240 |
| EQUAL TO OR MORE THAN 60 A | 120 |
| EQUAL TO OR MORE THAN 40 A | 20 |
| EQUAL TO OR MORE THAN 20 (I1) A | 2 |

PERIOD OF FADING PROCESS
T1
T2

STEERING TORQUE T
TORQUE CONDITION SATISFIED

ACTUAL CURRENT Im
85A
35.7A
I1=20A

MOTOR ROTATION SPEED Nm
N1

FIRST COUNTER
CT
0

SECOND COUNTER
CT
0

CORRECTION FACTOR R
1
0.42
0
0.176

ELECTRIC POWER STEERING APPARATUS, CONTROL METHOD THEREOF AND PROGRAM

TECHNICAL FIELD

The present invention relates to an electric power steering apparatus, a control method thereof and a program.

BACKGROUND ART

Recently, an electric power steering apparatus has been proposed, which includes an electric motor in a vehicle steering system and assists a driver with his or her steering force by use of power of the electric motor. A technique for preventing a failure of the electric motor used in the power steering apparatus has also been proposed.

For example, an electric power steering apparatus disclosed in Patent Literature 1 includes a unit that determines, when an average current is equal to or more than a predetermined value, a maximum limitation value that decreases by a predetermined value at predetermined intervals and a motor current limitation unit that limits the motor current by the maximum limitation value.

CITATION LIST

Patent Literature

Patent Document 1: Japanese Patent Examined Publication No. 6-51474

SUMMARY OF INVENTION

Technical Problem

It is desirable to suppress the failure of the electric motor due to an excessive current flowing through the electric motor with higher accuracy.

Solution to Problem

In order to attain the object, in the present invention, there is provided an electric power steering apparatus including: an electric motor that applies steering assist force to a steering wheel; a calculator that calculates a target current to be supplied to the electric motor on the basis of steering torque of the steering wheel; and a correction unit that, when a rotation speed of the electric motor is less than a predetermined rotation speed, corrects the target current calculated by the calculator to be reduced on the basis of an actual current supplied to the electric motor and a time during which the actual current is supplied.

Here, it is preferable that, when the actual current supplied to the electric motor is more than a predetermined current value, the correction unit corrects the target current so that the target current becomes smaller as the actual current is larger.

Further, it is preferable that, when the actual current supplied to the electric motor is more than a predetermined current value, the correction unit corrects the target current so that the target current becomes smaller as the time during which the actual current is supplied is longer.

Furthermore, it is preferable that, when a traveling speed of a vehicle equipped with the electric power steering apparatus is equal to or more than a predetermined speed, the correction unit makes the predetermined rotation speed smaller compared to a case where the traveling speed of the vehicle is less than the predetermined speed.

From another standpoint, in the present invention, there is provided a control method of an electric power steering apparatus including: calculating a target current to be supplied to an electric motor applying steering assist force to a steering wheel on the basis of steering torque of the steering wheel; and when a rotation speed of the electric motor is less than a predetermined rotation speed, correcting the calculated target current to be reduced on the basis of an actual current supplied to the electric motor and a time during which the actual current is supplied.

From further standpoint, in the present invention, there is provided a program causing a computer to executing processing including: calculating a target current to be supplied to an electric motor applying steering assist force to a steering wheel on the basis of steering torque of the steering wheel; and when a rotation speed of the electric motor is less than a predetermined rotation speed, correcting the calculated target current to be reduced on the basis of an actual current supplied to the electric motor and a time during which the actual current is supplied.

Advantageous Effects of Invention

According to the present invention, it is possible to suppress the failure of the electric motor due to an excessive current flowing through the electric motor with higher accuracy.

BRIEF DESCRIPTION OF DRAWINGS

FIGS. 5A and 5B are diagrams showing a relation between an actual current supplied to the electric motor and an addition value;

DESCRIPTION OF EMBODIMENTS

An exemplary embodiment of the present invention will be described in detail below with reference to the accompanying drawings.

Figure 1:
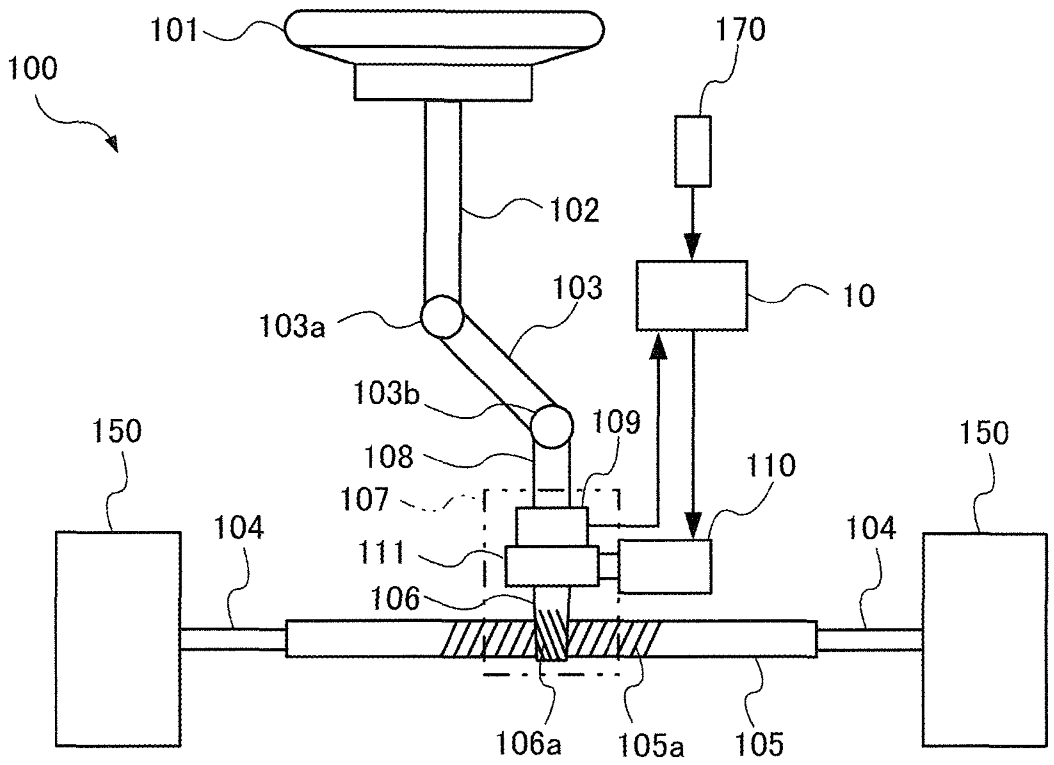
FIG. 1 is a diagram showing an outline configuration of an electric power steering apparatus according to the exemplary embodiment.

FIG. 1 is a diagram showing an outline configuration of an electric power steering apparatus 100 according to the exemplary embodiment.

The electric power steering apparatus 100 (hereinafter sometimes called simply the "steering apparatus 100") acts as the steering apparatus for changing the direction of travel of a vehicle into any direction, and, in the exemplary embodiment, exemplifies a configuration as applied to an automobile.

The steering apparatus 100 includes a steering wheel 101 in the form of wheel which a driver operates, and a steering shaft 102 provided integrally with the steering wheel 101. The steering shaft 102 and an upper connecting shaft 103 are connected together via a universal coupling 103*a*, and the upper connecting shaft 103 and a lower connecting shaft 108 are connected together via a universal coupling 103*b*.

Also, the steering apparatus 100 includes tie rods 104 connected respectively to right and left front wheels 150 as rolling wheels, and a rack shaft 105 connected to the tie rods 104. Also, the steering apparatus 100 includes a pinion 106*a* that forms a rack-and-pinion mechanism in conjunction with rack teeth 105*a* formed on the rack shaft 105. The pinion 106*a* is formed at a lower end portion of a pinion shaft 106.

Also, the steering apparatus 100 includes a steering gear box 107 in which the pinion shaft 106 is housed. In the steering gear box 107, the pinion shaft 106 is connected to the lower connecting shaft 108 via a torsion bar. In addition, provided in the steering gear box 107 is a torque sensor 109 as an example of a steering torque detector that detects a steering torque T of the steering wheel 101 on the basis of a relative angle between the lower connecting shaft 108 and the pinion shaft 106.

Also, the steering apparatus 100 includes an electric motor 110 supported by the steering gear box 107, and a speed reduction mechanism 111 that reduces drive power of the electric motor 110 and transfers the reduced drive power to the pinion shaft 106. The electric motor 110 according to the exemplary embodiment is a three-phase brushless motor. The magnitude and direction of an actual current actually passing through the electric motor 110 are detected by a motor current detector 33 (see FIG. 4).

The steering apparatus 100 includes a control device 10 that controls actuation of the electric motor 110. Inputted to the control device 10 are an output value from the aforementioned torque sensor 109, and an output value from a vehicle speed sensor 170 that detects a vehicle speed Vc, which is a traveling speed of the automobile.

The steering apparatus 100 configured as described above detects the steering torque T applied to the steering wheel 101 by the torque sensor 109, drives the electric motor 110 in accordance with the detected torque, and transmits torque produced by the electric motor 110 to the pinion shaft 106. Thereby, the torque produced by the electric motor 110 assists a driver's steering force applied to the steering wheel 101.

Next, a description will be given with regard to the control device 10.

Figure 2:
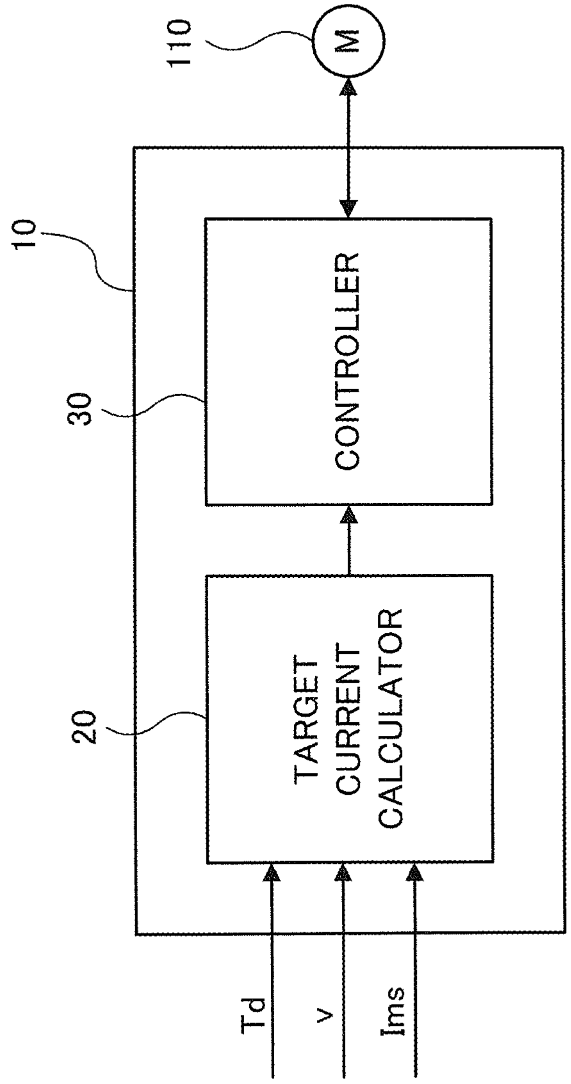
FIG. 2 is a schematic configuration diagram of a control device of the electric power steering apparatus.

FIG. 2 is a schematic configuration diagram of the control device 10 of the steering apparatus 100.

The control device 10 is an arithmetic logic circuit formed of a CPU, a ROM, a RAM, a backup RAM and the like.

Inputted to the control device 10 are: a torque signal Td obtained through the conversion of the steering torque T detected by the above-mentioned torque sensor 109 into an output signal; a vehicle speed signal v obtained through the conversion of the vehicle speed Vc detected by the vehicle speed sensor 170 into an output signal; and the like.

The control device 10 includes a target current calculator 20 that calculates a target assist torque on the basis of the torque signal Td and calculates a target current required for the electric motor 110 to supply the target assist torque, and a controller 30 that performs feedback control or the like on the basis of the target current calculated by the target current calculator 20.

Figure 3:
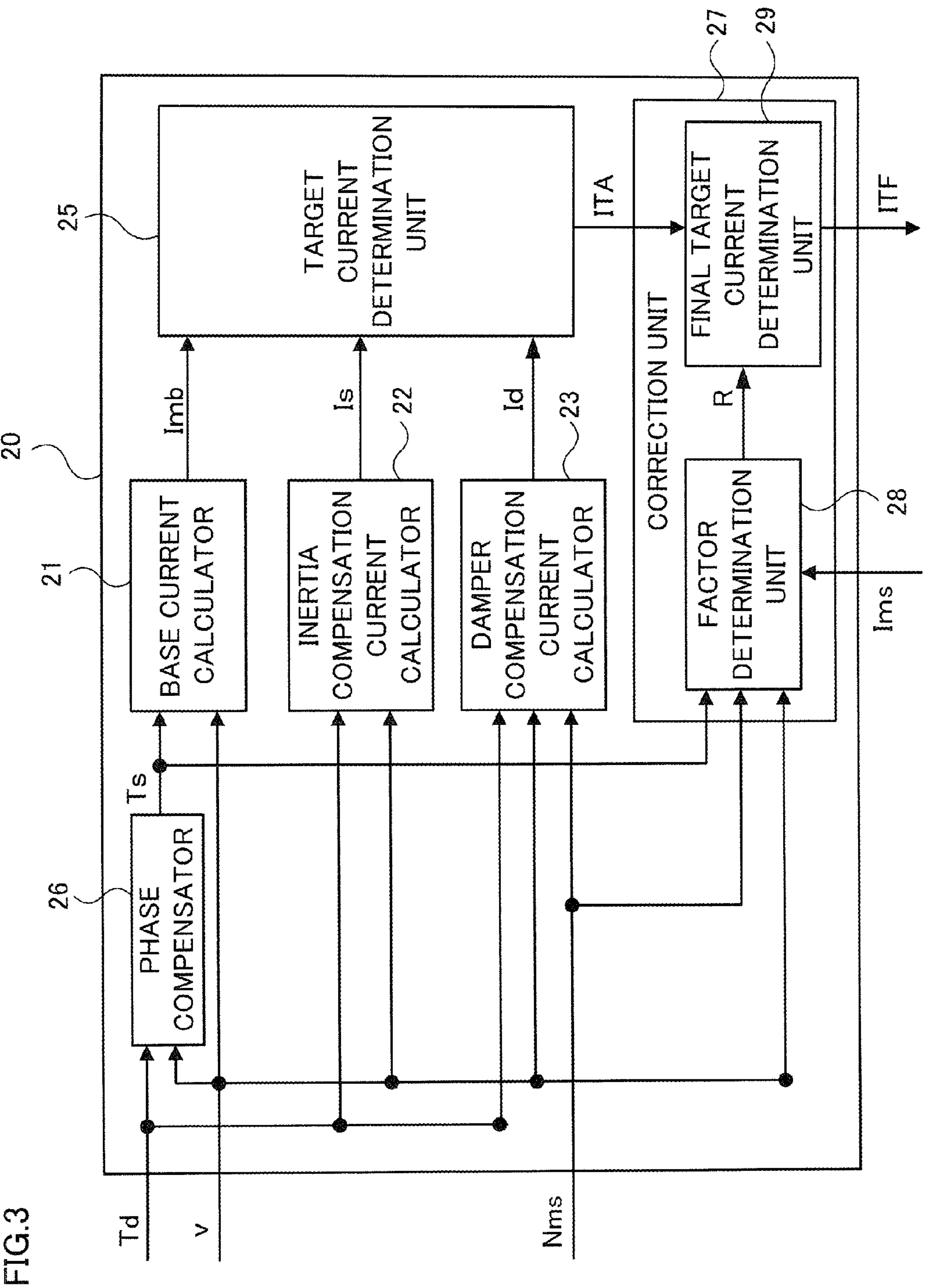
FIG. 3 is a schematic configuration diagram of a target current calculator.

Next, a detailed description will be given with regard to the target current calculator 20. FIG. 3 is a schematic configuration diagram of the target current calculator 20.

The target current calculator 20 includes a base current calculator 21 that calculates a base current for use as a reference for setting the target current, and an inertia compensation current calculator 22 that calculates a current to cancel out an inertia moment of the electric motor 110 and a damper compensation current calculator 23 that calculates a current to limit motor rotations. Also, the target current calculator 20 includes a target current determination unit 25 that determines the target current on the basis of outputs from the base current calculator 21, the inertia compensation current calculator 22, the damper compensation current calculator 23, and so on, and a correction unit 27 as an example of a correction unit that corrects the target current determined by the target current determination unit 25 to be reduced in a predetermined case and determines the corrected value as a final target current.

Inputted to the target current calculator 20 are the torque signal Td, the vehicle speed signal v, a motor current signal Ims obtained through the conversion of the actual current Im detected by the motor current detector 33 into an output signal, and a rotation speed signal Nms obtained through the conversion of a rotation speed Nm of the electric motor 110 into an output signal. By way of example, the rotation speed signal Nms may be obtained through the differentiation of an output signal of a sensor (for example, a rotor position detecting circuit formed of a resolver or a rotary encoder for detecting a rotation position of a rotor) that detects a rotation position of the rotator (rotor) of the electric motor 110, which is, for example, the three-phase brushless motor.

Incidentally, since the signals from the vehicle speed sensor 170 and the like are inputted to the control device 10 in analog form, the analog signals are converted into digital signals by an A/D (analog-to-digital) converter (not shown in the figure) and the digital signals are captured in the target current calculator 20.

The base current calculator 21 calculates the base current on the basis of a torque signal Ts obtained through a phase compensation of the torque signal Td by a phase compensator 26, and the vehicle speed signal v from the vehicle speed sensor 170, and outputs a base current signal Imb containing information on the base current. Incidentally, the base current calculator 21 calculates the base current by, for example, substituting the detected torque signal Ts and the vehicle speed signal v into a map showing the correspondence between a combination of the torque signal Ts and the vehicle speed signal v and the base current, which has previously been created on the basis of an empirical rule and been stored in the ROM.

The inertia compensation current calculator 22 calculates an inertia compensation current to cancel out the inertia moment of the electric motor 110 and a system, on the basis of the torque signal Td and the vehicle speed signal v, and outputs an inertia compensation current signal Is containing information on the inertia compensation current. Incidentally, the inertia compensation current calculator 22 calculates the inertia compensation current by, for example, substituting the detected torque signal Td and the vehicle speed signal v into a map showing the correspondence between a combination of the torque signal Td and the vehicle speed signal v and the inertia compensation current, which has previously been created on the basis of an empirical rule and been stored in the ROM.

The damper compensation current calculator 23 calculates a damper compensation current to limit the rotations of the electric motor 110, on the basis of the torque signal Td, the vehicle speed signal v, and the rotation speed signal Nms of the electric motor 110, and outputs a damper compensation current signal Id containing information on the damper compensation current. Incidentally, the damper compensation current calculator 23 calculates the damper compensation current by, for example, substituting the detected torque signal Td, the vehicle speed signal v and the rotation speed signal Nms into a map showing the correspondence between a combination of the torque signal Td, the vehicle speed signal v and the rotation speed signal Nms and the damper compensation current, which has previously been created on the basis of an empirical rule and been stored in the ROM.

The target current determination unit 25 determines the target current on the basis of the base current signal Imb outputted by the base current calculator 21, the inertia compensation current signal Is outputted by the inertia compensation current calculator 22 and the damper compensation current signal Id outputted by the damper compensation current calculator 23, and outputs a target current signal ITA containing information on the current. The target current determination unit 25 calculates the target current by, for example, substituting a compensation current obtained by adding the inertia compensation current to the base current and subtracting the damper compensation current therefrom into a map showing the correspondence between the compensation current and the target current, which has previously been created on the basis of an empirical rule and been stored in the ROM. As described above, the target current determination unit 25 functions as an example of a calculator that calculates the target current to be supplied to the electric motor 110 on the basis of the steering torque T of the steering wheel 101.

The correction unit 27 includes a factor determination unit 28 that determines a correction factor R by which the target current determined by the target current determination unit 25 is multiplied and a final target current determination unit 29 that determines a final target current on the basis of the target current determined by the target current determination unit 25 and the factor determined by the factor determination unit 28. Though the correction unit 27 will be described in detail later, the final target current determination unit 29 determines the final target current on the basis of the target current signal ITA outputted by the target current determination unit 25 and the correction factor R determined by the factor determination unit 28, and outputs a target current signal ITF containing information on the final target current.

Figure 4:
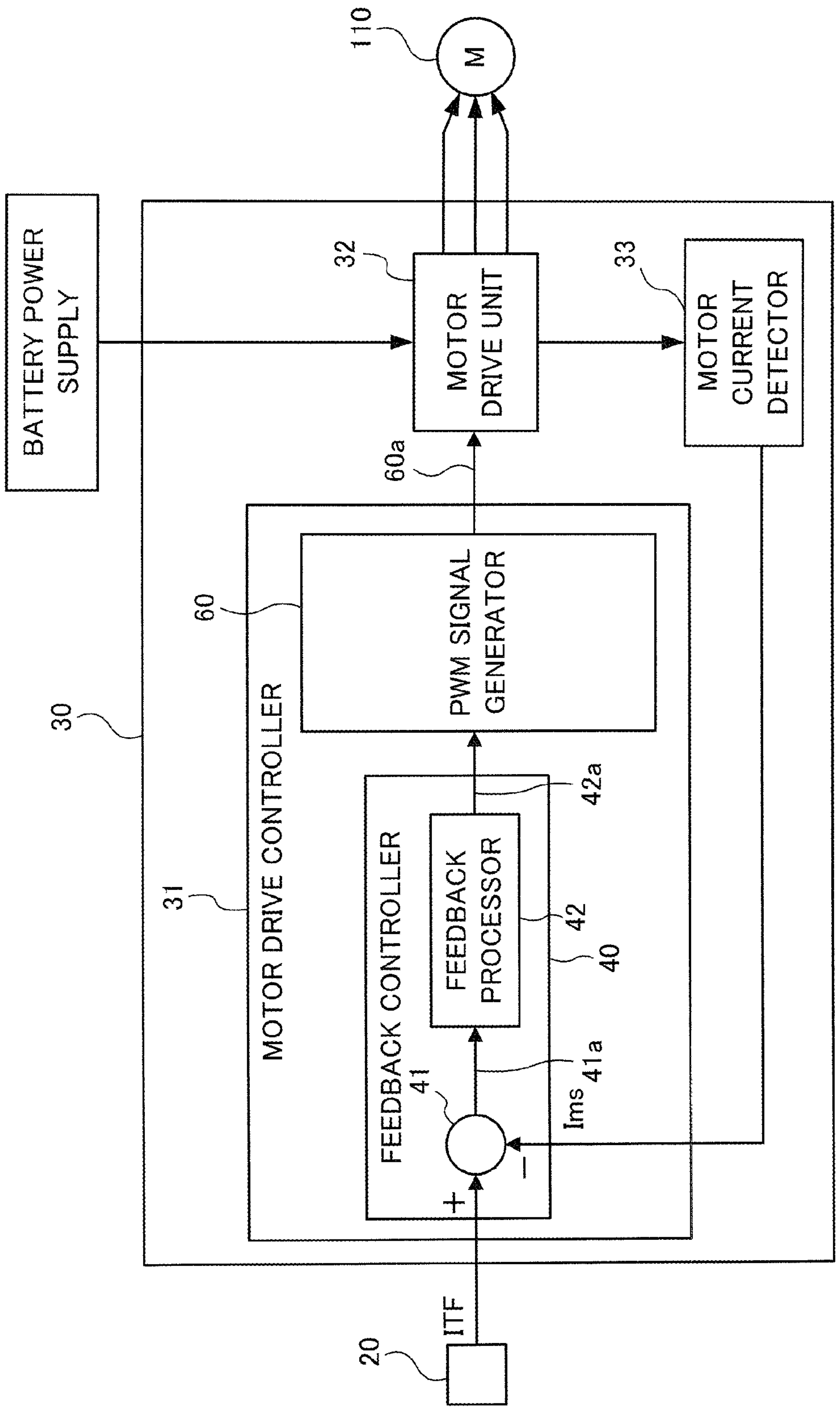
FIG. 4 is a schematic configuration diagram of a controller.

Next, a detailed description will be given with regard to the controller 30. FIG. 4 is a schematic configuration diagram of the controller 30.

The controller 30 includes a motor drive controller 31 that controls the actuation of the electric motor 110, a motor drive unit 32 that drives the electric motor 110 and the motor current detector 33 that detects the actual current Im actually flowing through the electric motor 110.

The motor drive controller 31 includes a feedback (F/B) controller 40 that performs feedback control on the basis of a deviation between the target current finally determined by the target current calculator 20 and the actual current Im detected by the motor current detector 33, which is supplied to the electric motor 110, and a PWM signal generator 60 that generates a pulse width modulation (PWM) signal to provide PWM drive to the electric motor 110.

The feedback controller 40 includes a deviation calculator 41 that determines the deviation between the target current finally determined by the target current calculator 20 and the actual current Im detected by the motor current detector 33 and a feedback (F/B) processor 42 that performs feedback processing so that the deviation would become zero.

The deviation calculator 41 outputs, as a deviation signal 41*a*, the value of the deviation between the target current signal ITF outputted from the target current calculator 20 and the motor current signal Ims outputted from the motor current detector 33.

The feedback (F/B) processor 42 serves to perform feedback control so that the actual current Im would coincide with the target current, and generates and outputs a feedback processing signal 42*a* by, for example, outputting a signal obtained through proportional processing performed by a proportional element with regard to the inputted deviation signal 41*a*; outputting a signal obtained through integral processing performed by an integral element with regard to the inputted deviation signal 41*a*; and adding these signals together by an add operation unit.

The PWM signal generator 60 generates a PWM signal 60*a* on the basis of the output value from the feedback controller 40, and outputs the generated PWM signal 60*a*.

The motor drive unit 32 is a so-called inverter, and includes, for example, mutually independent six transistors (FET) as switching elements, in which three transistors among six are connected between a positive side line of a power supply and an electric coil of each phase and the other three transistors are connected between an electric coil of each phase and a negative side (earth) line of the power supply. The gates of two transistors selected from the six are driven to provide switching operations to these transistors, thereby controlling the drive of the electric motor 110.

The motor current detector 33 detects the value of the actual current Im flowing through the electric motor 110, from a voltage between both ends of a shunt resistor connected to the motor drive unit 32, converts the detected actual current Im into the motor current signal Ims and outputs the motor current signal Ims.

Next, a more detailed description will be given with regard to the correction unit 27.

If a turned state of the steering wheel 101, such as an end contact state of the steering wheel 101, is maintained for a long time or a garage parking operation is repeated for a long time, a high current continuously flows in the electric motor 110, which might result in heating to cause smoke or smell, and besides, burning. Therefore, in the case where such incidents might occur, it is preferable not to supply the electric motor 110 with the target current determined by the target current determination unit 25 on the basis of the steering torque T at all times without any control, but to limit the target current determined by the target current determination unit 25 in advance. However, if the current supply to the electric motor 110 is instantly stopped in the case where such incidents might occur, the burden of operating the steering wheel 101 on the user becomes heavy. Consequently, in the steering apparatus 100 according to the exemplary embodiment, the correction unit 27 is provided to correct, in the case where a failure may occur in the electric motor 110 or the control device 10 due to heating caused in the electric motor 110 or the control device 10, to determine a current value smaller than the target current determined by the target current determination unit 25 as the final target current. In the correction unit 27 according to the exemplary embodiment, considering that the electric motor 110 according to the exemplary embodiment is the three-phase brushless motor, and especially, a magnet of a specific phase is susceptible to damage due to a high current flowing only in the specific phase in a low rotation speed, the target current determined by the target current determination unit 25 is corrected on the basis of the supplied current and the supply time of the current during the period of low rotation speed of the electric motor 110.

Inputted to the factor determination unit 28 are the vehicle speed signal v, the motor current signal Ims, the torque signal Ts obtained through phase compensation of the torque signal Td and the rotation speed signal Nms of the electric motor 110. On the basis of the information such as the vehicle speed signal v, the torque signal Ts, the motor current signal Ims and the rotation speed signal Nms having been obtained, the factor determination unit 28 then determines a value smaller than 1 as the correction factor R so as to determine a current smaller than the target current determined by the target current determination unit 25 as the final target current.

The final target current determination unit 29 multiplies the target current determined by the target current determination unit 25 by the correction factor R determined by the factor determination unit 28; if the result value is equal to or more than a predetermined current value, the result value is determined as the final target current; if the result value is less than the predetermined current value, the predetermined current value is determined as the final target current. Thereafter, the final target current signal ITF containing information on the final target current is outputted.

The factor determination unit 28 and the final target current determination unit 29 will be described more specifically below.

The factor determination unit 28 executes, at predetermined time intervals, a correction factor determination process that is arithmetic processing for determining the correction factor R. In the correction factor determination process, it is determined whether or not the rotation speed Nm of the electric motor 110 is smaller than a predetermined rotation speed N1 (or N2, depending on the vehicle speed Vc, as described later). In the case of being smaller, it is further determined whether or not the current supplied to the electric motor 110 is equal to or more than a predetermined current value I1. In the case of being equal to or more than the current value I1, an addition value Cp shown in FIG. 5 described later is added. The addition value Cp is a value corresponding to the current supplied to the electric motor 110, In the case of being less than the current value I1, a predetermined value Cm is subtracted. In the correction factor determination process, the correction factor R is determined to be 1 (initial value R0) until the total of the addition values Cp having been added so far, referred to as Ctotal, exceeds an initially predetermined threshold value CT, and when exceeds, a value less than 1 is determined as the correction factor R. The correction factor R according to the exemplary embodiment is obtained by multiplying the correction factor R set as of the time point by a predetermined value $\alpha$ that is less than 1 ($R \leftarrow R \times \alpha$). It should be noted that $\alpha$ may be a constant value 0.42, by way of example.

Even though the correction factor R is changed, the addition values Cp are added up again, and when the total Ctotal exceeds the threshold value CT once again, the correction factor R set as of the time point is multiplied by a ($R \leftarrow R \times \alpha$). For that purpose, the factor determination unit 28 includes plural counters: the first counter among the plural counters is used to add up the addition values Cp until the correction factor R is initially changed; once the correction factor R is changed, the second counter among the plural counters is used to add up the addition values Cp; in this manner, in the case where the correction factor R is changed n times, the n-th counter among the plural counters is used to add up the addition values Cp.

Incidentally, it is preferable that the aforementioned predetermined current value I1 is a maximum value such that, in the case where the rotation speed Nm of the electric motor 110 is zero, even if the current of the value is continuously supplied to the electric motor 110 with any vehicle speed Vc, a failure of the electric motor 110 due to heating does not occur. By way of example, the predetermined current value I1 may be 20 A. Consequently, it is possible to suppress the failure of the electric motor 110 and the control device 10 while meeting the needs from the user to the fullest extent.

Further, it is preferable that the predetermined rotation speed N1 is a minimum value such that, even if a current of the available current value to the electric motor 110 is continuously supplied to the electric motor 110, a failure of the electric motor 110 due to heating does not occur. By way of example, the predetermined rotation speed N1 may be 0.4 rps.

The addition value Cp added in accordance with the current supplied to the electric motor 110 in the case where the supplied current value is equal to or more than the current value I1 is changed in accordance with the vehicle speed Vc. FIGS. 5A and 5B show correlations between the actual current Im supplied to the electric motor 110 and the addition value Cp. FIG. 5A is a correlation diagram in the case where the vehicle speed Vc is less than a predetermined speed V0, and FIG. 5B is a correlation diagram in the case where the vehicle speed Vc is equal to or more than the predetermined speed V0. As shown in FIGS. 5A and 5B, the addition value Cp added in accordance with the actual current Im supplied to the electric motor 110 in the case where the supplied current value is equal to or more than the current value I1 is set larger in the case where the vehicle speed Vc is less than the predetermined speed V0 than in the case where the vehicle speed Vc is equal to or more than the predetermined speed V0, even though the actual current Im supplied to the electric motor 110 is the same. It should be noted that the current value I1 is set to 20 A.

Moreover, in the case where the vehicle speed Vc is equal to or more than the predetermined speed V0, it is determined whether or not the rotation speed Nm of the electric motor 110 is smaller than a rotation speed N2, which is smaller than the rotation speed N1 in the case where the vehicle Vc is less than the speed V0. In the case of being smaller, the values shown in the figure are added. This aims to prevent a false detection in normal driving, not with a steering wheel operation in stopping, and reduces the rotation speed Nm of the target electric motor 110 while making the addition value Cp according to the actual current Im supplied to the electric motor 110 smaller, thereby suppressing the target current determined by the target current determination unit 25 to be reduced by the correction unit 27. By way of example, the predetermined rotation speed N2 may be 0.2 rps.

It should be noted that the addition value Cp is determined based on the premise that the supply of the actual current Im to the electric motor 110 is continued during intervals in executing the correction factor determination process, and that the addition value Cp depends upon the product of the actual current Im and the time during which the supply of the actual current Im is continued.

Further, in the correction factor determination process, after determining the correction factor R to be less than 1 when the total of the addition values Cp having been added so far, which is referred to as Ctotal, exceeds the predetermined threshold CT, the factor determination unit 28 changes the correction factor R back to the initial value R0, that is 1, in the case where a torque condition and a motor rotation speed condition described below are satisfied.

The torque condition refers to the case where an absolute value of the steering torque T at the present time detected by the torque sensor 109 is less than a value obtained by subtracting a predetermined torque from an absolute value of the steering torque T at the time point at which the correction factor R is set to a value less than 1 (at the time point at which the correction factor R is changed to a value less than 1 from 1 initially, if the correction factor R is decreased from 1 in a multistep process), or the case where the direction of the steering torque T at the time point at which the correction factor R is set to a value less than 1 differs from the direction of the steering torque T at the present time. In a word, the torque condition refers to the case where the following expression (1) or (2) is satisfied.

|the steering torque $T$ at the time point at which the correction factor $R$ is set to a value less than 1|−a predetermined torque≥|the steering torque $T$ at the present time| (1)

the direction of the steering torque $T$ at the time point at which the correction factor $R$ is set to a value less than 1≠the direction of the steering torque $T$ at the present time (2)

The motor rotation speed condition refers to the case where an absolute value of the motor rotation speed Nm when the vehicle speed Vc is less than the predetermined speed V0 is equal to or more than the aforementioned rotation speed N1, or the case where an absolute value of the motor rotation speed Nm when the vehicle speed Vc is equal to or more than the predetermined speed V0 is equal to or more than the aforementioned rotation speed N2. In a word, the motor rotation speed condition refers to the case where the following expression (3) or (4) is satisfied.

$$|Nm| \geq N1, \text{ where zero} \leq \text{vehicle speed } Vc < V0 \quad (3)$$

$$|Nm| \geq N2, \text{ where vehicle speed } Vc \geq V0 \quad (4)$$

However, after the torque condition and the motor rotation speed condition are satisfied and the correction factor R is changed back to 1, it may be assumed that a current equal to or more than the current value I1 is supplied to the electric motor 110 while the rotation speed Nm of the electric motor 110 is reduced in relatively an early stage again. Accordingly, subtractions in a stepwise manner are performed on the total of the addition values Cp added in accordance with the actual current Im supplied to the electric motor 110, referred to as Ctotal, in the case where the current is equal to or more than the current value I1, as described above, to be reduced to zero in the following case (5) or (6). (5) The actual current Im supplied to the electric motor 110 is less than the current value I1 whatever the vehicle speed Vc and the motor rotation speed Nm may be. In such a case, a subtraction value Cm1 is subtracted from the total Ctotal. By way of example, the subtraction value Cm1 may be 100. (6) The vehicle speed Vc is equal to or more than zero and less than V0 and an absolute value of the motor rotation speed Nm is equal to or more than the rotation speed N1, or, the vehicle speed Vc is equal to or more than V0 and an absolute value of the motor rotation speed Nm is equal to or more than the rotation speed N2. In such a case, a subtraction value Cm2 is subtracted from the total Ctotal. By way of example, the subtraction value Cm2 may be 100.

Next, a description will be given with regard to the correction factor determination process performed by the factor determination unit 28 by using flowcharts.

Figure 6:
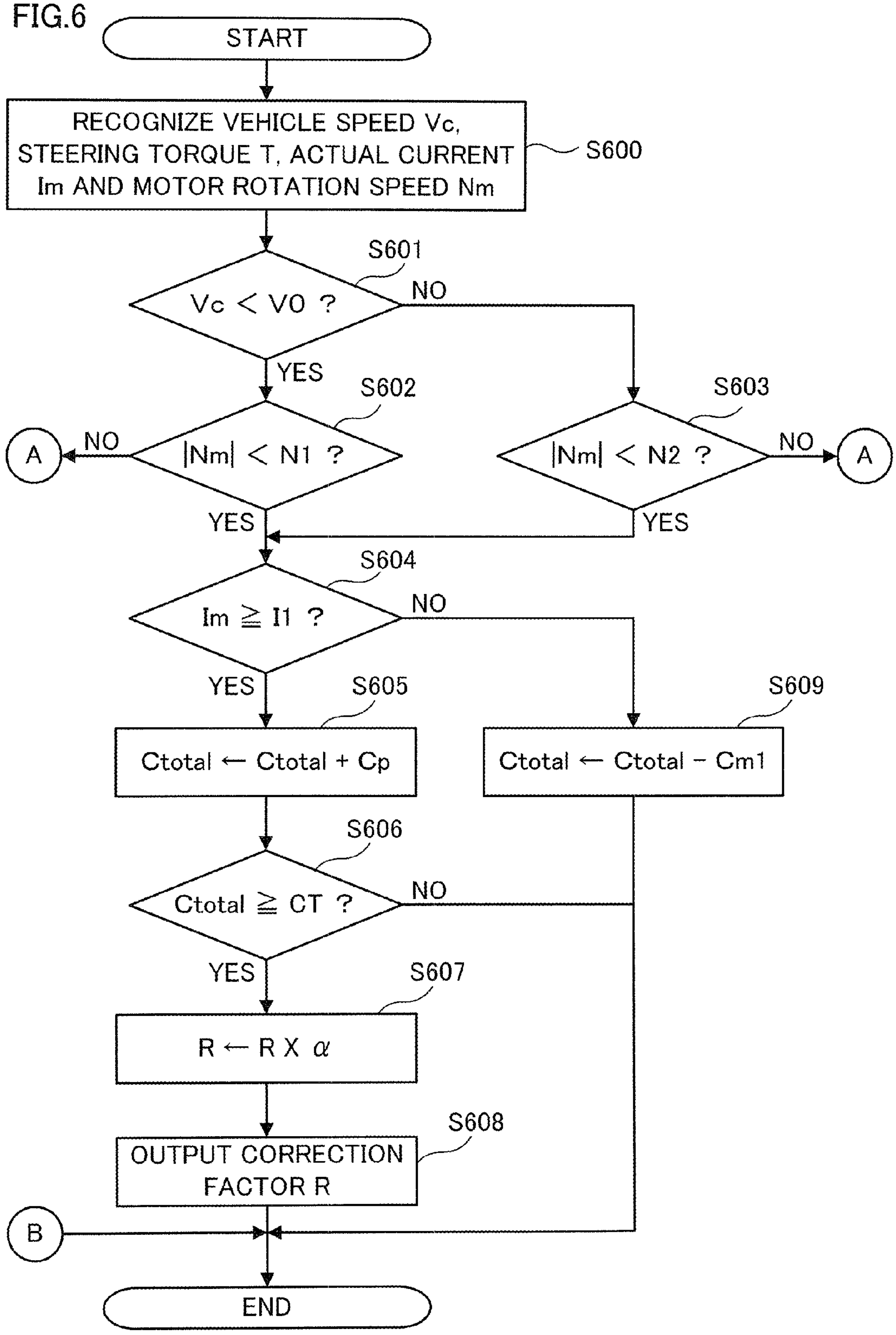
FIG. 6 is a flowchart showing procedures of the correction factor determining process performed by the factor determining unit.
Figure 7:
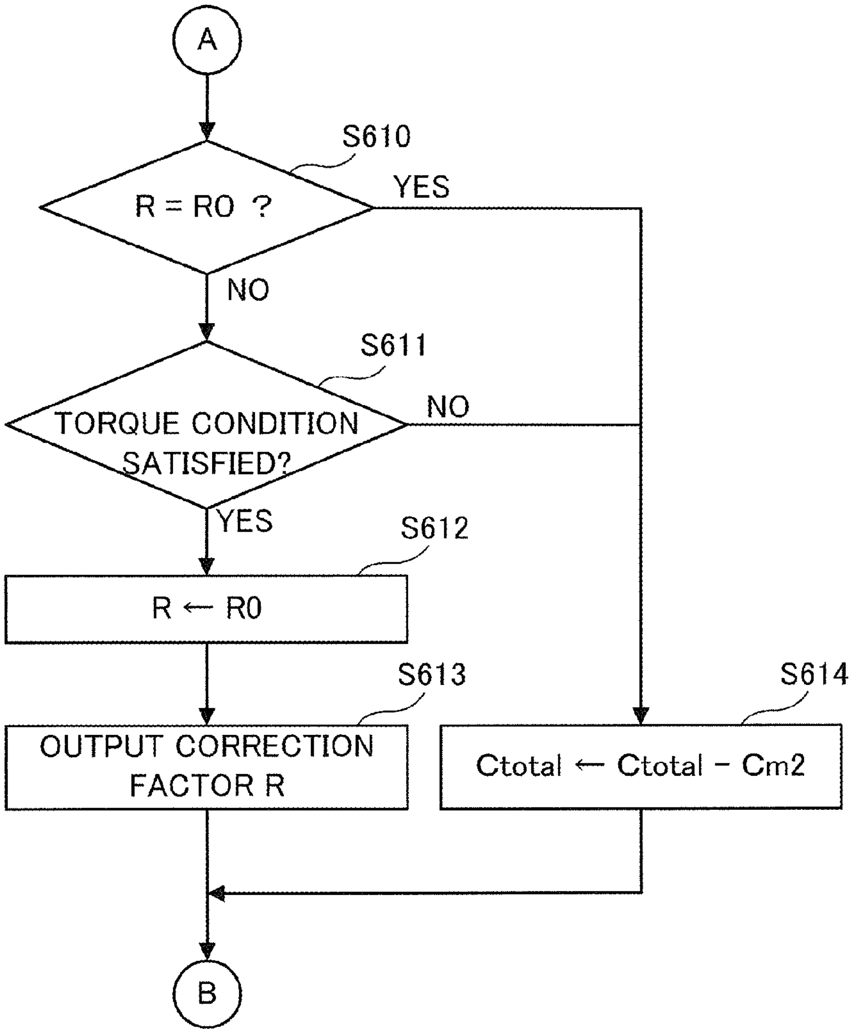
FIG. 7 is a flowchart showing the procedures of a correction factor determining process performed by a factor determining unit.

FIGS. 6 and 7 are flowcharts showing procedures of the correction factor determination process performed by the factor determination unit 28. The factor determination unit 28 performs the correction factor determination process on a regular basis, for example, every 10 ms.

The factor determination unit 28, at first, recognizes the vehicle speed Vc, the steering torque T, the actual current Im flowing in the electric motor 110 and the rotation speed Nm of the electric motor 110 on the basis of the vehicle speed signal v, the torque signal Ts, the motor current signal Ims and the rotation speed signal Nms which have been obtained (step (hereinafter, simply referred to as "S") 600).

Next, the factor determination unit 28 determines whether or not the vehicle speed Vc is less than the predetermined speed V0 (S601). If an affirmative determination is provided in S601, it is further determined whether or not the absolute value of the rotation speed Nm of the electric motor 110 is less than the rotation speed N1 (S602). On the other hand, if a negative determination is provided in S601, it is further determined whether or not the absolute value of the rotation speed Nm of the electric motor 110 is less than the rotation speed N2 (S603).

In the case where an affirmative determination is provided in S602 and the case where an affirmative determination is provided in S603, it is further determined whether or not the actual current Im supplied to the electric motor 110 is equal to or more than the predetermined current value I1 (S604). If an affirmative determination is provided in S604, an addition value Cp according to the actual current Im is added to the total of the addition values accumulated so far, which is referred to as Ctotal (Ctotal←Ctotal+Cp) (S605). Thereafter, it is determined whether or not the total of the addition values, referred to as Ctotal, is equal to or more than the predetermined threshold value CT (S606). If an affirmative determination is provided in S606, the correction factor R is reduced (R←R×α) (S607). An initial value R0 of the correction factor R is set to 1. The changed correction factor R is then outputted (S608). On the other hand, if a negative determination is provided in S606, the execution of the process is completed.

On the other hand, if a negative determination is provided in S604, the predetermined subtraction value Cm1 is subtracted from the total of the addition values accumulated so far, which is referred to as Ctotal (Ctotal←Ctotal−Cm1) (S609). It should be noted that, when Ctotal becomes a negative value by subtracting the subtraction value Cm1 from the total of the addition values accumulated so far, which is referred to as Ctotal, Ctotal is set to zero.

In the case where a negative determination is provided in S602 and the case where a negative determination is provided in S603, it is determined whether or not the correction factor R at the present time is the initial value R0 (in the exemplary embodiment, 1) (S610). If a negative determination is provided in S610, it is determined whether or not the aforementioned torque condition is satisfied (S611). If an affirmative determination is provided in S611, since the aforementioned torque condition and the motor rotation speed condition are satisfied, the correction factor R is changed back to the initial value R0 (S612), and the changed correction factor R is outputted (S613).

In the case where an affirmative determination is provided in S610 and the case where a negative determination is provided in S611, the predetermined subtraction value Cm2 is subtracted from the total of the addition values accumulated so far, which is referred to as Ctotal (Ctotal←Ctotal−Cm2) (S614). It should be noted that, in S614, if Ctotal becomes a negative value by subtracting the subtraction value Cm2 from the total of the addition values accumulated so far, which is referred to as Ctotal, Ctotal is set to zero.

These are the descriptions with regard to the correction factor determination process performed by the factor determination unit 28.

As described above, the final target current determination unit 29 multiplies the target current determined by the target current determination unit 25 by the correction factor R determined by the factor determination unit 28. If the result value is equal to or more than the predetermined current value I1, the result value is determined as the final target current. If the result value is less than the predetermined current value I1, the predetermined current value I1 is determined as the final target current. For example, in the case where the predetermined current value I1 is 20 A, and where the target current determined by the target current determination unit 25 is 80 A and the correction factor R determined by the factor determination unit 28 is 0.42 (=42%), the value obtained by multiplying the target current determined by the target current determination unit 25 by the correction factor R is 33.6 A. Since the obtained value is equal to or more than 20 A, the final target current is determined to be 33.6 A. On the other hand, in the case where the target current determined by the target current determination unit 25 is 40 A and the correction factor R determined by the factor determination unit 28 is 0.42 (=42%), the value obtained by multiplying the target current determined by the target current determination unit 25 by the correction factor R is 16.8 A. Since the obtained value is less than 20 A, the predetermined current 20 A is determined to be the final target current.

Moreover, in determining the final target current on the basis of the target current determined by the target current determination unit 25 and the correction factor R, when the correction factor R is changed, it is preferable that the final target current determination unit 29 does not immediately use a correction factor Rnew after changing in place of a correction factor Rold before changing, but performs a fading process that gradually changes the correction factor Rold to the correction factor Rnew over a predetermined time. For example, when Rold=1 is changed to Rnew=0.42, it is preferable to gradually change the value from 1 to 0.42 so that the correction factor R results in 0.42 after a lapse of the predetermined time of 1500 ms.

Further, in the case where the correction factor R is changed back to the initial value from a value other than the initial value, it is also preferable not to use the changed value immediately, but to perform the fading process that gradually changes the correction factor Rold to the correction factor Rnew=1 over a predetermined time. For example, when Rold=0.42 is changed to Rnew=1, it is preferable to gradually change the value from 0.42 to 1 so that the correction factor R results in 1 after a lapse of the predetermined time of 900 ms.

It should be noted that, in the case where the final target current determination unit 29 performs the fading process, it is preferable that the factor determination unit 28 suspends a counting process that adds the addition value Cp or subtracts the subtraction value Cm in the correction factor determination process during the period of performing the fading process.

Next, a description will be given with regard to function of the steering apparatus 100 configured as described above by using a timing chart. It should be noted that the aforementioned values are: the predetermined current value I1 is 20 A; the predetermined threshold value CT is 600000; and the predetermined value α, which is less than 1, is 0.42. The aforementioned fading process is performed while suspending the counting process during the period of performing the fading process.

FIGS. 8A to 8F are timing charts showing the function of the controlling device 10 according to the exemplary embodiment. It should be noted that the counter values of the aforementioned plural counters for adding the addition values Cp are supposed to be initially all zero. Further, the vehicle speed Vc is supposed to be always less than the speed V0 within the scope shown by FIGS. 8A to 8F.

Figures 8A, 8B, 8C, 8D, 8E, 8F:
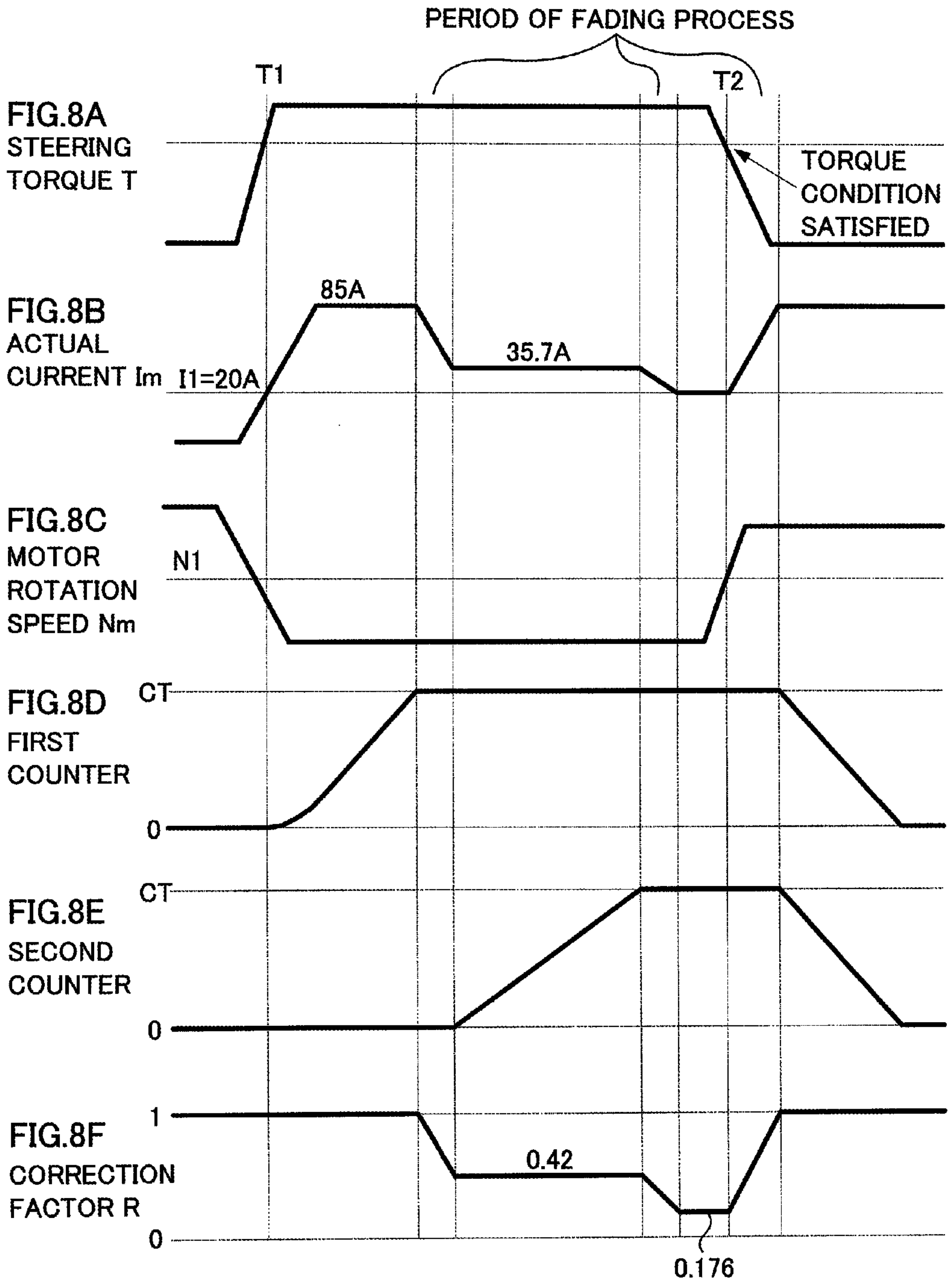
FIGS. 8A to 8F are timing charts showing operations of the control device according to the exemplary embodiment.

As the steering torque T is increased, the target current determined by the target current determination unit 25 is also increased and the actual current Im supplied to the electric motor 110 is increased up to 85 A (see FIGS. 8A and 8B). Meanwhile, the rotation speed Nm of the electric motor 110 is decreased (see FIG. 8C). At the time point T1, it is assumed that the motor rotation speed Nm is less than the rotation speed N1 and the actual current Im exceeds 20 A, and thereafter, the motor rotation speed Nm continues to be less than the rotation speed N1 while the actual current Im gradually varies up to 85 A. In such a case, in the correction factor determination process performed on a regular basis, the factor determination unit 28 adds up the addition values Cp according to the actual current Im shown in FIG. 5A from the time point T1 with one of the plural counters (the first counter) (S605). FIG. 8D shows the state of increase of the total of the addition values Cp, referred to as Ctotal, in the first counter. When it is determined that the total of the addition values Cp, namely Ctotal, of the first counter is equal to or more than the threshold value CT (when an affirmative determination is provided in S606), the correction factor R is changed from the initial value 1 to 1×α=0.42 through the fading process (see FIG. 8F). As a result, the correction is performed by the correction unit 27 after the lapse of the predetermined time during which the fading process is performed, and thereby the final target current outputted from the target current calculator 20 is 85×0.42=35.7 A (≥20 A), then this resulting current is determined to be the actual current Im supplied to the electric motor 110.

After that, since the motor rotation speed Nm is less than the rotation speed N1 and the actual current Im is 35.7 A, the factor determination unit 28 adds up the addition values Cp according to the actual current Im shown in FIG. 5A with another one of the plural counters (the second counter) (S605). FIG. 8E shows the state of increase of the total of the addition values Cp, which is referred to as Ctotal, in the second counter. When it is determined that the total of the addition values Cp, namely Ctotal, of the second counter is equal to or more than the threshold value CT (when an affirmative determination is provided in S606), the correction factor R is changed from the value at the present time 0.42 to 0.42×α=0.176 through the fading process (see FIG. 8F). As a result, the correction is performed by the correction unit 27 after the lapse of the predetermined time during which the fading process is performed, and thereby the final target current outputted from the target current calculator 20 is the predetermined current value I1, that is 20 A (because 85×0.176=14.99<20 A), then this resulting current is determined to be the actual current Im supplied to the electric motor 110.

Thereafter, if it is assumed that the aforementioned torque condition and motor rotation speed condition are satisfied at the time point T2, a negative determination is provided in S602, a negative determination is provided in S610 and an affirmative determination is provided in S611 in the correction factor determination process performed by the factor determination unit 28, then the correction factor R is changed back to the initial value 1 through the fading process (S612). As a result, the final target current outputted from the target current calculator 20 after the lapse of the predetermined time during which the fading process is performed is the target current determined by the target current determination unit 25, and thereby the resulting current is the actual current Im supplied to the electric motor 110.

Thereafter, since the motor rotation speed Nm is equal to or more than the rotation speed N1, a negative determination is provided in S602 and an affirmative determination is provided in S610 in the correction factor determination process performed by the factor determination unit 28, then the subtraction value Cm2 is subtracted from the total Ctotal in all counters (S614).

As has been discussed, with the steering apparatus 100 according to the exemplary embodiment, occurrence of the failure of the electric motor due to heating is suppressed with higher accuracy in comparison with an electric power steering apparatus not according to the exemplary embodiment. Moreover, with the steering apparatus 100 according to the exemplary embodiment, since the target current determined by the target current determination unit 25 is corrected on the basis of the rotation speed Nm of the electric motor 110, the actual current Im supplied to the electric motor 110, the time during which the actual current Im is supplied and the vehicle speed Vc, and determined as the final target current outputted from the target current calculator 20, the present invention may be generally applied, irrespective of vehicles equipped with the steering apparatus 100.

It should be noted that, in the aforementioned exemplary embodiment, $\alpha$ used to reduce the correction factor R is a constant value, however, it goes without saying that a may be a variable. Further, the addition value Cp shown in FIGS. 5A and 5B is supposed to be a fixed value assuming that the correction factor determination process performed by the factor determination unit 28 is executed on a regular basis; however, in the case where the factor determination unit 28 performs the correction factor determination process irregularly, the addition value Cp may be determined on the basis of the actual current Im that is supplied and the time during which the actual current Im is supplied. For example, it is preferable to determine the value by multiplying the actual current Im by the time during which the actual current is supplied.

REFERENCE SIGNS LIST

10 Control device
20 Target current calculator
25 Target current determination unit
27 Correction unit
30 Controller
100 Electric power steering apparatus
101 Steering wheel
109 Torque sensor
110 Electric motor
170 Vehicle speed sensor

The invention claimed is:

1. An electric power steering apparatus comprising:

an electric motor that applies steering assist force to a steering wheel;

a calculator that calculates a target current to be supplied to the electric motor on the basis of steering torque of the steering wheel; and a correction unit that, when a rotation speed of the electric motor is less than a predetermined rotation speed, corrects the target current calculated by the calculator to be reduced on the basis of an actual current supplied to the electric motor and a time during which the actual current is supplied, wherein when the actual current supplied to the electric motor is more than a predetermined current value, the correction unit corrects the target current so that the target current becomes smaller as the actual current is larger.

2. The electric power steering apparatus according to claim 1, wherein, when the actual current supplied to the electric motor is more than a predetermined current value, the correction unit corrects the target current so that the target current becomes smaller as the time during which the actual current is supplied is longer.

3. The electric power steering apparatus according to either claim 1 or 2, wherein, when a traveling speed of a vehicle equipped with the electric power steering apparatus is equal to or more than a predetermined speed, the correction unit makes the predetermined rotation speed smaller compared to a case where the traveling speed of the vehicle is less than the predetermined speed.

4. A control method of an electric power steering apparatus comprising:

calculating a target current to be supplied to an electric motor applying steering assist force to a steering wheel on the basis of steering torque of the steering wheel; and when a rotation speed of the electric motor is less than a predetermined rotation speed, correcting the calculated target current to be reduced on the basis of an actual current supplied to the electric motor and a time during which the actual current is supplied, and when the actual current supplied to the electric motor is more than a predetermined current value, correcting the calculated target current so that the target current becomes smaller as the actual current is larger.

5. A program causing a computer to executing processing comprising:

calculating a target current to be supplied to an electric motor applying steering assist force to a steering wheel on the basis of steering torque of the steering wheel; and when a rotation speed of the electric motor is less than a predetermined rotation speed, correcting the calculated target current to be reduced on the basis of an actual current supplied to the electric motor and a time during which the actual current is supplied, and when the actual current supplied to the electric motor is more than a predetermined current value, correcting the calculated target current so that the target current becomes smaller as the actual current is larger.

* * * * *